United States Patent
Budhiraja et al.

(10) Patent No.: US 7,120,896 B2
(45) Date of Patent: Oct. 10, 2006

(54) INTEGRATED BUSINESS PROCESS MODELING ENVIRONMENT AND MODELS CREATED THEREBY

(75) Inventors: Navin Budhiraja, Fremont, CA (US); Marion Dale Skeen, Atherton, CA (US); Haiying Wang, Palo Alto, CA (US); Elisa Jill Rubin, Melno Park, CA (US); Deb Banerjee, Sunnyvale, CA (US)

(73) Assignee: Vitria Technology, Inc., Sunnyvale, CA (US)

( * ) Notice: Subject to any disclaimer, the term of this patent is extended or adjusted under 35 U.S.C. 154(b) by 766 days.

(21) Appl. No.: 09/984,977

(22) Filed: Oct. 31, 2001

(65) Prior Publication Data

US 2003/0084127 A1    May 1, 2003

(51) Int. Cl.
  *G06F 9/44*    (2006.01)
  *G06F 17/00*   (2006.01)
  *G06F 9/46*    (2006.01)

(52) U.S. Cl. .................... 717/105; 717/109; 717/113; 715/763; 715/771; 719/330

(58) Field of Classification Search ............... 717/107, 717/100, 108, 110, 118, 105, 109, 113; 709/219, 709/226, 249; 710/200; 718/103; 715/763, 715/771; 719/330
See application file for complete search history.

(56) References Cited

U.S. PATENT DOCUMENTS

| | | | |
|---|---|---|---|
| 5,341,500 A * | 8/1994 | Moyer et al. ............... 710/200 |
| 5,390,173 A * | 2/1995 | Spinney et al. ............. 370/393 |
| 5,557,798 A | 9/1996 | Skeen et al. |
| 5,581,691 A | 12/1996 | Hsu et al. |
| 5,790,855 A * | 8/1998 | Faustini ...................... 717/100 |
| 5,884,317 A | 3/1999 | Cline et al. |
| 5,889,988 A * | 3/1999 | Held .......................... 718/103 |
| 5,913,065 A * | 6/1999 | Faustini ...................... 717/107 |
| 5,926,637 A | 7/1999 | Cline et al. |
| 5,960,421 A | 9/1999 | Cline et al. |
| 6,006,277 A | 12/1999 | Talati et al. |
| 6,038,601 A | 3/2000 | Lambert et al. |
| 6,115,744 A | 9/2000 | Robins et al. |
| 6,128,742 A | 10/2000 | Felt |
| 6,151,608 A | 11/2000 | Abrams |
| 6,216,151 B1 | 4/2001 | Antoun |
| 6,236,999 B1 | 5/2001 | Jacobs et al. |
| 6,253,257 B1 | 6/2001 | Dundon |
| 6,349,298 B1 | 2/2002 | Malone et al. |
| 6,557,164 B1 * | 4/2003 | Faustini ...................... 717/107 |
| 6,687,745 B1 * | 2/2004 | Franco et al. ............... 709/219 |
| 6,807,580 B1 * | 10/2004 | Freeman et al. ............ 709/249 |
| 6,816,902 B1 * | 11/2004 | Bandat et al. .............. 709/226 |
| 6,934,755 B1 * | 8/2005 | Saulpaugh et al. .......... 709/226 |

OTHER PUBLICATIONS

PCT International Search Report for PCT/US02/34865, dated Mar. 4, 2003.

* cited by examiner

*Primary Examiner*—Antony Nguyen-Ba
(74) *Attorney, Agent, or Firm*—Marc S. Kaufman; Nixon Peabody, LLP

(57) ABSTRACT

An integrated modeling environment for creating integration models of computer architecture for executing business processes. The models include components having ports defining standard interfaces. The components can represent business process models for executing business processes. Connection information is stored in a repository so that binding of communication protocols can occur during deployment after creation of the model and can be looked up during runtime.

41 Claims, 5 Drawing Sheets

INTEGRATED BUSINESS PROCESS MODELING ENVIRONMENT AND MODELS CREATED THEREBY

BACKGROUND

The present invention relates generally to a graphical object oriented business process modeling environment and more specifically to such an environment in which interacting components representing business processes can be created, manipulated, tested, deployed, and executed in a flexible manner.

It is well known to automate various business systems, such as Customer Relations Management (CRM), Enterprise Resource Planning (ERP), accounting, inventory control, order processing and the like. Historically, such systems were each handled by dedicated software packages that did not integrate well with each other. Early software programs for automating business systems were designed to run independently, with no interaction between various systems. Such programs were custom built for a specific need being addressed and often utilized proprietary protocols. Dedicated "point to point" connections were developed to permit each such system to communicate with another such system. For example, an inventory control system may exchange data with an accounting system through a customized software interface. However, as the number of systems increases, the quantity and complexity of point to point connections also increase. Further, point to point connections are rather inflexible and do not facilitate reconfigurations of systems to accommodate changing business models.

The concept of "Enterprise Application Integration" (EAI) refers to the sharing of data throughout applications and data sources in an organization. As enterprises grow and require increased flexibility of data sharing throughout various systems, EAI is used to streamline processes and keep all the elements of the enterprise interconnected. EAI can include database linking, application linking, and data warehousing.

Various systems for accomplishing EAI are well known. For example, Service Oriented Architectures (SOA), in which a common set of services are exposed by different layers, are known. Also, Event Oriented Architectures (EOA) in which a publish/subscribe messaging system is used to change the states of activities based on events, is known. Further, standard connectivity protocols and message formats such as Remote Method Invocation (RMI) and eXtensible Markup Language (XML) have been established to facilitate EAI.

The concept of "value chains," i.e., a series of business activities that create value, has become a useful paradigm for analyzing and improving the efficiency of businesses. Such activities include business processes, such as order entry, shipping, invoicing, CRM, and the like. Value chains are dependent on the internal business processes of a company, the business processes of trading partners, such as suppliers, and the relationship between the company and trading partners. It has become popular to experiment with and change value chains to optimize efficiency and profitability. Such change requires reconfiguration of business processes and the integration therebetween. EAI has facilitated such reconfiguration of business systems.

It is also known to provide an object oriented environment for modeling and configuring the above-described integration of various applications in a graphical manner to further facilitate configuration and reconfiguration of business systems. For example, the BusinessWare™ modeling environment sold by Vitria™ Technology, Inc. permits modeling of the integration of applications in a graphical manner by using "business process models," a technique becoming known as "business process management" (BPM).

Of course, a business process must communicate with other business processes to enable end to end integration. Therefore, creation of a business process requires knowledge of the identity of the business process(es) to which it will be connected and what messages can be received from and sent to these processes. In other words, the application designer must be concerned with business processes and the communication therebetween at the same level of abstraction.

Of course, it is known to control various business applications, and to create, deploy, and debug business process models. However, due to the complexities of communication between applications, and components, all of these phases are accomplished at different levels of abstraction by separate software tools. For example Computer Aided Software Engineering (CASE) tools, such as Rational Rose™ and ARIS™, provide analysis and documentation of business processes and the integration thereof. However, the flow charts and other diagrams created by CASE tools are not intended to be directly executed. Separate tools must be used to create executable models and deploy such models. Accordingly, it is difficult to develop, deploy, and debug business process management systems because of a lack of unified tools.

SUMMARY OF THE INVENTION

It is an object of the invention to increase the flexibility of business process models and modeling environments. To achieve this and other objects, a first aspect of the invention is a model comprised of a plurality of components coupled together in an object oriented, graphical representation of a computer architecture for executing one or more business processes. At least one of the components comprises executable process logic of a business process, a first port defining a standard interface for data flow between components, and code for looking up connection information stored in a repository. The connection information includes information indicating a second port to which the first port is to be connected, information relating to the type of the second port, and information indicating how to connect to the second port.

A second aspect of the invention is an object oriented, graphical model of a computer architecture for executing one or more business processes. The model comprises at least one component including executable process logic of a business process and a port defining a standard interface for data flow between components, and wires defining connection information between ports of desired components.

A third aspect of the invention is a method of creating an object oriented, graphical model of a computer architecture for executing one or more business processes. The method comprises defining a plurality of components, at least one of the components including executable process logic of a business process and at least one port defining a standard interface for data flow between components, defining connections between ports of desired components and, subsequently binding communication protocols to the connections to define communications parameters between desired components.

A fourth aspect of the invention is a method of deploying an object oriented, graphical model of a computer architecture for executing one or more business processes. The method comprises defining a plurality of components, at least one of the components including executable process logic of a business process and at least one port defining a standard interface for data flow between components, defining connections between ports of desired components, storing the components and connections in a repository as objects, and deploying the objects by configuring run time properties of the objects.

A fifth aspect of the invention is a computer implemented modeling environment for creating an object oriented, graphical model of a computer architecture for executing one or more business processes. The environment comprises means for defining at least one component including executable process logic of a business process and at least one port defining a standard interface for data flow between components, means for defining connections between ports of desired components, means for storing the components and connections in a repository as objects, and means for deploying the objects by configuring run time properties of the objects.

A sixth aspect of the invention is a method of debugging computer code utilizing an object oriented, graphical model of a computer architecture for executing one or more business processes. The method comprises defining a plurality of components, at least one of the components including executable process logic of a business process and at least one port defining a standard interface for data flow between components, defining connections between ports of desired components, and inserting graphical breakpoint objects into the model to permit observation and injection of events.

A seventh aspect of the invention is a method of creating reusable components for use in an object oriented, graphical representation of a computer architecture for executing one or more business processes. The method comprises defining child components including executable process logic of a business process and a port defining a standard interface for data flow between child components, defining connections between desired ports of the child objects, defining properties of the child objects that can be changed, and packaging the child objects as nested objects in a parent object.

BRIEF DESCRIPTION OF THE DRAWING

The invention is described through a preferred embodiment and the attached drawing in which.

GLOSSARY

Figure 1:
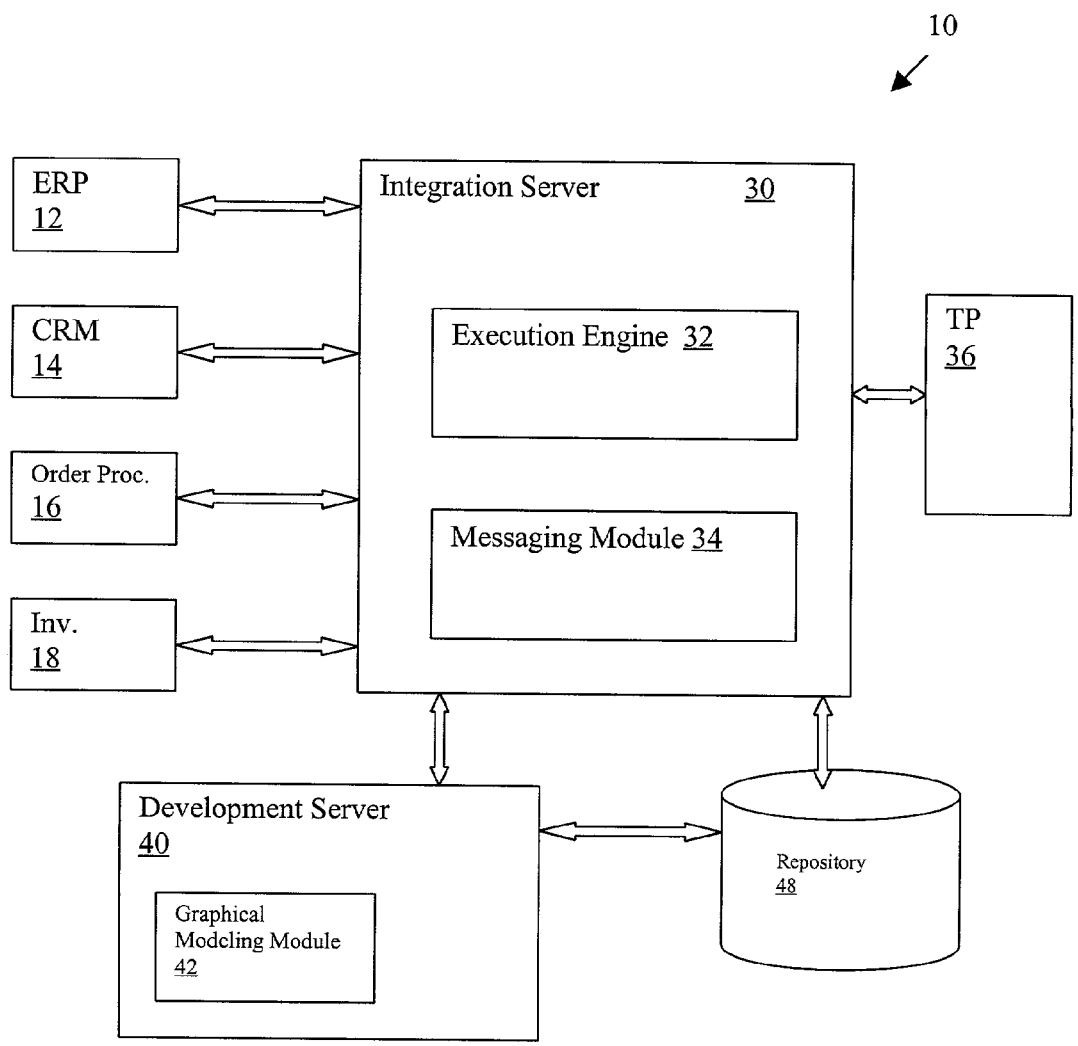
FIG. 1 is a block diagram of a computer architecture of the preferred embodiment.

The description below uses terms of art which are defined below:

Business Process Model—A state machine that models business processes at a semantic level and defines an executable specification for the underlying business logic.

Component—A reusable graphical representation of a business process model or other system element. A component can represent a business process model, a transformation, a process query, or another integration model and interacts with other components through a defined interface.

Deployment—The physical arrangement and configuration of a model.

Instance—A particular execution of a business process model or integration model.

Integration Model—A model that describes interactions between components from a data flow and dependency perspective.

Lightweight Directory Access Protocol (LDAP)—A set of protocols for accessing information directories.

Model—A representation in a certain form that captures the important aspects of the thing being modeled from a certain point of view and simplifies the rest.

Nested Business Process Model—A business process model that is nested within another business process model to serve as a mechanism for logic encapsulation and reuse of an existing model design.

Nested Integration Model—An integration model that is nested within another integrated model to provide a mechanism for logic encapsulation and reuse of an existing model design.

Object—Generally, any item, or a graphical representation of the item, that can be individually selected and manipulated.

Port—A representation of the set of interfaces a component exposes.

Process Query—A request for information, such as status information, from a business process.

Transformation—A component that converts one data type or protocol to another data type or protocol.

Wire—A graphical representation of connectivity between ports.

DETAILED DESCRIPTION

Applicant has introduced a new type of model, called the "integration model," that is used to provide a graphical end to end, or global, view of an integration application. The integration model shows how the various business process models in the corresponding integration application are connected to one another and communicate with one another. The integration model allows the application designer to work at multiple levels of abstraction. For example. The application designer can work at the integration model level to model connectivity and the data flow between various business process models and, when desired, can "drill down" into the business process model to create or modify the details of the individual business processes. The integration model can be debugged, deployed for execution, and directly executed by a runtime environment.

Applicant has developed a graphical modeling environment in which business process logic of components is separated from the communications aspects of a model to permit abstraction of a complete integration scenario without regards to physical deployment of the model. Accordingly, integration models created in the modeling environment can be deployed and debugged in a flexible manner. Further, nested components and reusable components can be easily created in the modeling environment. The preferred embodiment described below provides a single integrated modeling environment in which the modeler can create business process models, nested components, reusable components, and integration models. Deployment and debugging can be accomplished in the same integrated modeling environment.

FIG. 1 illustrates architecture 10 for developing, deploying, and executing business process models and integration models in accordance with a preferred embodiment. Business process systems, such as ERP system 12, CRM system 14, order processing system 16, and inventory system 18 control associated business processes and are coupled to integration server 30 over a network or other communication channel. In addition, trading partner system 36, such as the integration server of a supplier or other external party, is coupled to integration server 30 over the Internet or other communication channel, such as a local area network (LAN). Integration server 30 is coupled to development server 40 and repository 48 through appropriate communication channels such as a LAN. Repository 48 is illustrated as a separate device but can be embodied within integration server 30 or development server 40. Repository 48 includes a storage device and can include processing logic as will become apparent below.

Development server 40 includes graphical modeling module 42, in the form of software, which provides the modeling environment, including a user interface, for configuring business process models and integration models. Integration server 30 includes execution engine 32 for executing an integration model after deployment. Integration models are executed by execution engine 32 by directing the flow of information among the underlying internal and external systems 12, 14, 16, 18, and 36. After defining the business processes that need to be automated, a developer then creates graphical models of those processes, and the integration thereof, with graphical modeling module 42. The resulting integration model consists of plural components representing underlying executable code for executing and integrating the various business processes.

Integration server 30 also includes messaging module 34 which serves as a messaging layer or infrastructure for execution engine 32 and systems 12, 14, 16, 18, and 36. For example, an event-driven publish-subscribe methodology can be deployed via communications channels to transport information in a consistent format between systems. In the case of communication with external systems, messaging module 34 can transform data into standard formats, such as XML or EDI, and transport the data in an encrypted form over networks using standard protocols such as HTTP, FTP and SMTP.

Figure 2:
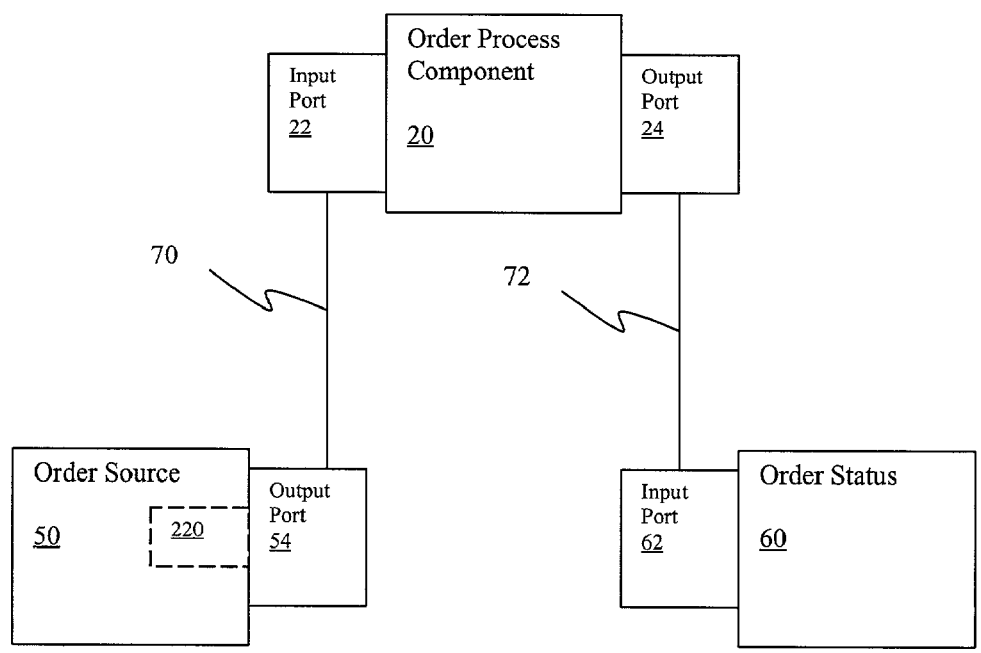
FIG. 2 is an example of an integration model created by the automation module of the preferred embodiment, i.e., the integration model level.

FIG. 2 illustrates a simple example of an integration model developed by graphical modeling module 42 through the user interface. The integration model consists of order process component 20 representing an underlying business process model as discussed in detail below, order source component 50, and order status component 60. Order source component 50 can represent an external system of a trading partner or any other source of order information. Order status component 60 can represent a database file or any other system for recording and/or tracking order status. Order source component 50 and order status component 60 can include transformations that serve to transform one data format to another to exchange information between the systems represented by the components. Order process component 20 has input port 22 and output port 24 associated therewith, order source component 50 has output port 54 associated therewith, and order status component 60 has input port 62 associated therewith. The appropriate ports are connected by lines, referred to as "wires" herein, which define the connections between ports. Specifically wires 70 and 72 couple the ports as illustrated. Ports are described in greater detail below. All elements can be created, configured, and manipulated through the user interface in a graphical manner, much the same as in a simple drawing program.

Figure 3:
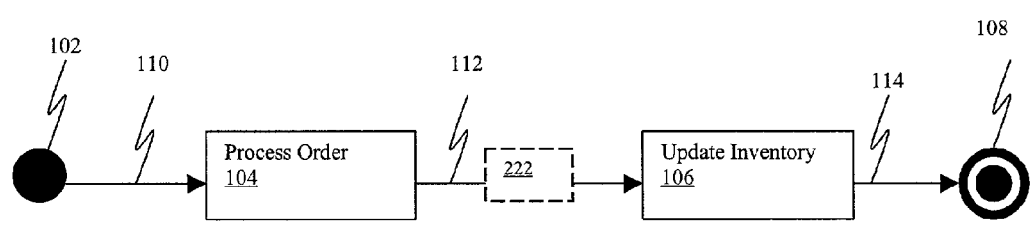
FIG. 3 illustrates a business process model of the example of FIG. 2, i.e., the state/transition level.

The business process model underlying order process component 20 can also be create in a graphical environment using graphical modeling module 42. the business process model can be accessed by double clicking on the corresponding component or in any other manner. FIG. 3 illustrates an example of such a business process model. The business process model consists of four states, start state 102, process order state 104, update inventory state 106, and termination state 108. Transitions 110, 112, and 114 connect the states as illustrated. Transitions define the logic that is executed to move an instance of the business process model from one state to the next state. Accordingly, transitions may have action code associated therewith. The action code can be any code that can be executed directly, compiled, translated, or otherwise processed for execution. For example, the action code can be general purpose high-level programming software code objects such as a Java object. An example of action code to be associate with transition 110 is below. The Java code below records order information to be processed.

```
:
// record the order
myOrder.order(order)
CommonMessages.logGenericTrace ("Order" + myOrder.oid( ) +
    "received from customer" + order.customer);
```

Returning to the integration model of FIG. 2, ports define a standard way to represent the external interface of components and thus provide communication between components. At runtime, a port defines the communication protocol, such as CORBA, RMI, or the like, used for communication. In particular, when a component is created, code is automatically generated in correspondence to the port properties of the component for looking up, i.e. invoking, connection information for each port of the component, including the port to which it is connected, the type of the port, and how to connect to other ports. At runtime, this code serves to identify and bind the proper communication protocols. Ports can be directly bound to synchronous protocols, such as Hypertext Transfer Protocol (HTTP), WSDL, or Simple Object Access Protocol (SOAP). Channels are connector components that model asynchronous communication mechanisms and which can be inserted into the integration model as components between ports. Channels are also configured and stored in repository 48 as objects, separate and distinct from ports, and components.

The upstream port is defined as an output port and the downstream port is defined as an input port. Each port has underlying properties that can be assigned during integration model development and/or deployment. For example, a property sheet can be accessed through the user interface by right clicking on the port component, selecting a command from a menu, or the like. The properties associated with all components and ports can be stored in a directory structure in repository 48, which is an LDAP directory in the preferred embodiment, as described below. The user interface provides means for displaying all components and ports, all of which are stored as objects in repository 48.

Figure 4:
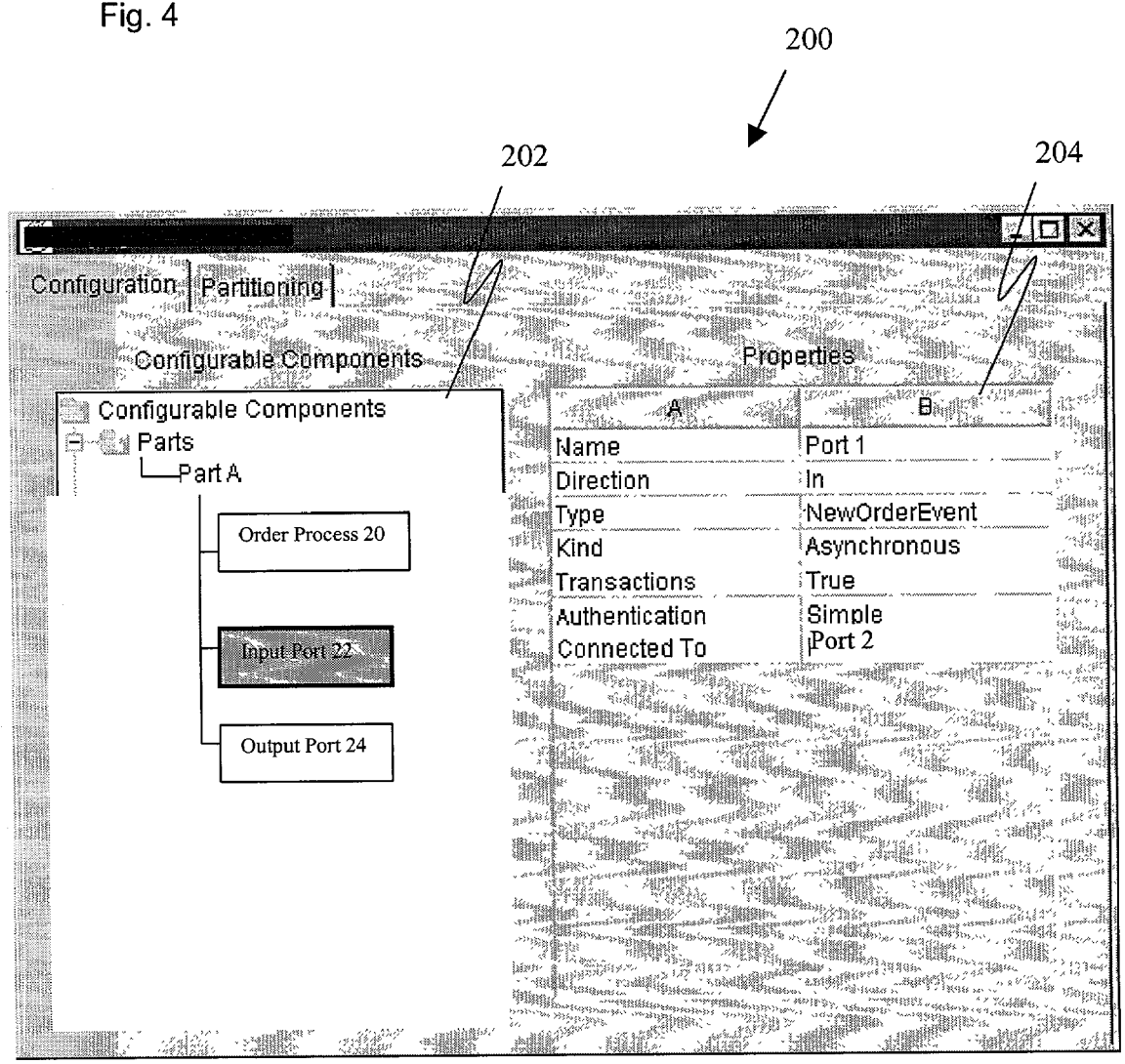
FIG. 4 illustrates the configuration display screen of the preferred embodiment.

FIG. 4 illustrates the configuration display screen 200 for viewing the objects stored in repository 48. In the preferred embodiment, the objects are displayed in a directory tree structure in window 202. It can be seen that the objects are grouped in a logical manner. For example, the folder named "Part A" includes the objects for order process component 20, the associated input port 22, and the associated output port 24. Of course, all other objects corresponding to an integration model, and objects corresponding to other integration models can be stored in repository 48 and displayed in window 202. However, in FIG. 4, such other objects have been omitted for clarity. Display window 204 displays a property sheet corresponding to the currently selected object in window 202. In this example, input port 22 is selected and indicated by shading. It can be seen that the property sheet includes connection information such as the port name, the port direction, the port type, the kind of port, the transactions of the port, the type of authentication, and the connections of the port. These properties can be either selected by the model designer or automatically assigned by the model configuration as described below.

The port name can be an arbitrary name assigned to the port to distinguish the port and its object from other ports and components. The name can be selected by the designer or automatically assigned by graphical modeling module 42. For example, the ports can be numbered in order of their creation or position in the model. Also, the ports can named based on the name of the component to which they are associated. For example, port 22 could be named "Order Process Input Port." The direction indicates the direction of flow of data or events through the port. The direction can be assigned automatically by graphical modeling module 42 based on the type of port and/or the connections which are defined by the wires described above. For example, input port 22 has a direction of "in" because, by definition, it is an input port.

The port type indicates the operation or event that passes through the port. For example, port 22 receives an event called "NewOrderEvent." This event is defined by the event passing through output port 54 connected to input port 22 by wire 70 (see FIG. 2). The event "NewOrderEvent" is an output event of the business process model underlying order source component 50. In this example, port 22 operates in a synchronous mode and is coupled directly to port 54 by wire 70. If communication between ports is to be asynchronous, meaning that the ports subscribe to a channel, que or the like and need not be ready to receive an event when the event is created, the appropriate component, such as a channel component, will be inserted in the model between the ports. The transactions of the port is "True" meaning that transactions can be propagated across components by invocation. The authentication of the port is "Simple" meaning that only password security is applied. In the alternative, authentication can be complex and require a certificate, key, or the like. Also, the port is connected to Port 2, which is the port name assigned to output port 54 in this example. This connection is automatically set based on the wires configured in the integration model illustrated in FIG. 2.

Once the integration model is configured, it represents a logical description of an application. Of course, to be executed, the model must be turned into a physical description that can be run in a run time environment. The process of changing from a logical model to a specific physical model is referred to as "deployment" herein. Deployment in the preferred embodiment consists of deployment configuration, partitioning, packaging, and installation steps. Once the integration model is created using graphical modeling module 42, the integration model can be deployed for a test environment or a production environment.

Deployment configuration refers to the steps involved in filling out unresolved component references including, component-specific properties, security references, and environment properties. Partitioning deals with making the integration model run efficiently by placing components on different nodes in a distributed environment. Partitioning must take into account the network topology, as well as characteristics of the nodes on which components are partitioned. Specifically, partitioning refers to placing the component in a 'home' node and server (e.g., channel server, web server or integration server) where it is to execute. Integration model components may be partitioned onto integration server 30. Channels may be partitioned onto a channel server. Partitioning may also involve load-balancing components by running multiple copies of components simultaneously. Packaging refers to how the components are organized into a unit fit for distribution/execution. For example, the Java standard for packaging components is a .jar (Java application resource) file, which can be used with the preferred embodiment.

Installation refers to how the files representing the solution are actually moved to the target nodes. The deployment package can be a shared directory service in repository 48. Runtime components and tools can all reference this location. Alternatively, the deployment package can be stored separately and extracted into repository 48 at a later time. Startup refers to how the configured, installed application is actually executed in its target environment.

Figure 5:
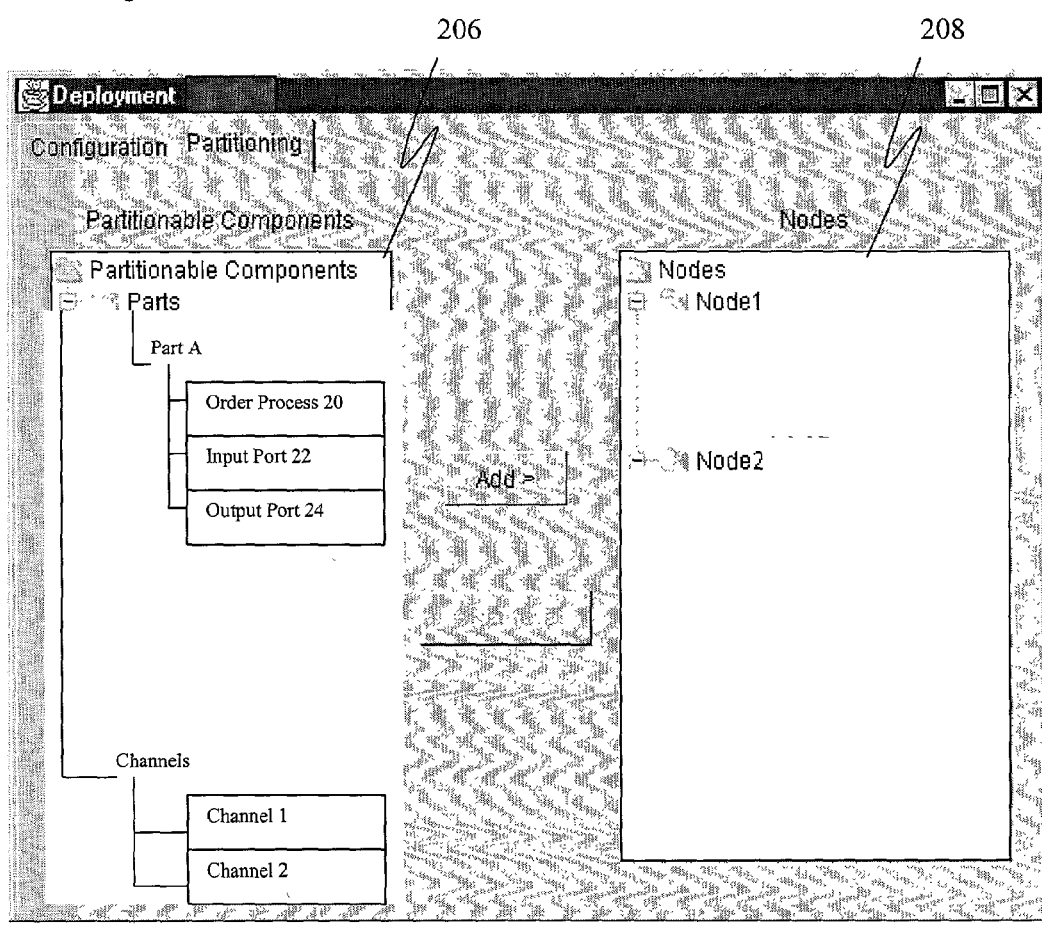
FIG. 5 illustrates the partitioning display of the preferred embodiment.

By selecting the partitioning tab of display 200 in FIG. 4, the deployment display of FIG. 5 is called up. The deployment display includes window 206 which shows all deployable objects of an integration model or plural integration models, some of which are omitted in FIG. 5 for simplicity, in a directory tree structure. Also, window 208 shows all physical nodes, i.e. computers, directories, networks, or the like of the physical distributed system, some of which are omitted in FIG. 5 for simplicity, in a directory tree structure. The designer can select an object in window 206 and a node in window 208 and press the "Add" button to partition the selected component to the selected node. Alternatively, a "drag and drop" interface can be used. The selected component object will be placed in the tree structure of window 208 under the selected node. Component objects can be selected from window 208 and the "Remove" button can be pressed to un-partition the component.

A button or menu selection can be activated to create a deployment package, e.g. a .jar file, deployment descriptors, and any other files needed for deployment. The deployment package can be stored in repository 48. Subsequently, error checks can be accomplished and the deployment can be installed in the proper nodes.

It can be seen that the preferred embodiment provides an integrated modeling environment in which the business process logic is separated from back-end integration and system issues. This separation allows the business analyst, not the programmer, to focus on the important work of designing business rules to solve specific business issues. Such separation also enables a "plug-and-play" architecture, i.e., an insulation layer that allows back-end systems to be changed without changing business processes, and vice-versa. Integration models and underlying business process models can be manipulated in a single environment. Deployment of the integration model permits direct execution of the integration model without the need for additional code.

The separation between logical and physical in the preferred embodiment also facilitates creation of reusable components. While the concept of reusable components is well known generally, the preferred embodiment permits a more flexible approach to reusable components. For example, a model designer can create an item that is desirable for reuse in the manner described above. The item can include nested child components, each representing an underlying business process. More specifically, the item to be used as a reusable component can be of any granularity from the top level integration model, an individual component, or a business process model. The designer selects the item using the user interface and is requested to enter an item name and destination file. A wizard can allow the designer to supply values for a destination package name, a short description, icon images to be associated with the item in the graphical environment, a customizer class, a version name or number, and any other parameters of the resulting object.

The user interface will then display a collection of the properties (including hidden and read only properties) that represent all the properties of all the elements in the hierarchy beneath the indicated item. For example, the elements can be code objects, such as Java objects. For each property in the collection, the designer can choose to either keep the value of the property or to turn the property into a property on the resulting reusable component. For properties that will be turned into properties on the resulting reusable component, the designer may provide a default/initial value and designate the property as being read only, hidden and/or expert. A new jar file is then generated for the object. The .jar file is created by generating source code file that implements the properties as described by the designer. This class will implement a port interface and a second class holding the new object's description will be generated. The live instance of the item that the designer initially selected can be serialized to a .ser file using standard Java serialization. The two source files can be compiled to .class files using a Java compiler. Then a JAR manifest will be computed. The java source files, their corresponding .class, files, the ser and the manifest file can be archived into JAR format and the temporary file removed from the designer's system.

Further, the separation between logic and communication of the preferred embodiment facilitates debugging in a flexible manner. It is well known to provide a debugging tool for remote debugging in a development environment. However, the integrated environment of the preferred embodiment permits the remote debugging process to be abstracted to the model level. Breakpoints and observation states can be inserted into a model as a graphic object and translated into breakpoints in code, such as Java code, to accomplish debugging based on standard tools. The designer can "step in" or "step out" of an integration model at any level, such as the business process model level, the integration model level or nested levels to insert a breakpoint at any port, transition, state, or the like. FIG. 2 illustrates graphical breakpoint object 220 at port 54 of the integration model and FIG. 3 illustrates graphical breakpoint object 222 at transition 112. Once breakpoints are set, debugging can be accomplished in a conventional manner.

The invention can be implemented on any device, such as a personal computer, server, or any other general purpose programmable computer or combination of such devices, such as a network of computers. Communication can be accomplished through any channel, such as a local area network (LAN), the Internet, serial communications ports, and the like. The communications channels can use wireless technology, such as radio frequency or infra-red technology. The various elements of the preferred embodiment are segregated by function for the purpose of clarity. However, the various elements can be combined into one device or segregated in a different manner. For example, software can be a single executable file and data files, or plural files or modules stored on the same device or on different devices.

The nodes can be a single device, such as a server, or plural devices, such as a network of computers. Any protocols, data types, or data structures can be used in accordance with the invention. The invention can be used to design, create, manipulate, test or use any business process model or integration model and can be used in combination with any type of system for affecting business processes or other functions. Any appropriate user interface can be used to design, create, and manipulate models. The underlying code can be written in any language, such as Java, C++, or the like.

The invention has been described through a preferred embodiment. However, various modifications can be made without departing from the scope of the invention as defined by the appended claims and legal equivalents thereof.

What is claimed is:

1. An integration model for graphically modeling and configuring business systems by integrating applications, the model comprising:
   components coupled together in an object oriented, graphical representation of a computer architecture for integrating plural business processes, wherein the components include:
   executable process logic of a business process to direct data flow among components;
   a first port defining, at run time, a standard representation of an external interface of said component for representing data flow between components; and
   code for identifying and binding the standard representation of the external interface and for looking up connection information stored in a repository, said connection information including information indicating a second port to which said first port is to be connected, information relating to the type of said second port, and information indicating how to connect to said second port.

2. The components as recited in claim 1, wherein said code is in the form of an object.

3. The components as recited in claim 2, wherein said code is written in an object-oriented programming language from a source of origin identified by JAVA.

4. The components as recited in claim 1, wherein said code is generated automatically based on properties of the ports.

5. The components as recited in claim 1, wherein said code defines a communication protocol.

6. The components as recited in claim 5, wherein the communication protocol defining how messages are to be formatted and how delivery is guaranteed is from a source of origin identified by CORBA.

7. The components as recited in claim 5, wherein the communication protocol is Remote Method Invocation (RMI).

8. The components as recited in claim 5, wherein the communication protocol corresponds to a channel.

9. The components as recited in claim 1, wherein said first port includes properties defining a direction and type of information flow.

10. The components as recited in claim 1, wherein the executable process logic is embodied in an integration model nested in said components.

11. The components as recited in claim 1, wherein the executable process logic is embodied in a business process model nested in said components.

12. An object oriented, graphical integration model of a computer architecture for integrating plural business processes, said model comprising:

plural components including executable process logic of a business process and a port defining a standard representation of an external interface of said components; and wires graphically connecting said components and defining connection information between ports of desired components;

wherein the port connection information is automatically defined at run-time based on the wires configured in an integration module.

13. The integration model as recited in claim 12, further comprising a repository for storing the connection information defined by said wires and port type information, and wherein said components include code for looking up said connection information and said port type information to facilitate deployment of connections between said components.

14. The integration model as recited in claim 13, wherein said connection information includes information indicating ports to be connected, information relating to the type of said ports, and information indicating how to connect said ports.

15. The integration model as recited in claim 13, wherein said code is in the form of an object.

16. The integration model as recited in claim 15, wherein said code is written in an object-oriented programming language from a source of origin identified by JAVA.

17. The integration model as recited in claim 13, wherein said code is generated automatically based on properties of the ports.

18. The integration model as recited in claim 17 wherein said properties of said ports include a direction and type of imformation.

19. The integration model as recited in claim 13, wherein said code defines a communication protocol.

20. The An integration model as recited in claim 19, wherein the communication protocol defining how messages are to be formatted and how delivery is guaranteed is from a source of origin identified by CORBA.

21. The integration model as recited in claim 19, wherein the communication protocol is Remote Method Invocation (RMI).

22. The integration model as recited in claim 19, wherein the communication protocol corresponds to a channel.

23. The integration model as recited in claim 12, wherein the executable process logic of at least one of said components is embodied in an integration model nested in said at least one of said components.

24. The integration model as recited in claim 12, wherein the executable process logic of at least one of said components is embodied in a business process model nested in said at least one of said components.

25. A method of creating an object oriented, graphical integration model of a computer architecture for integrating plural business processes, said method comprising:

identifying a plurality of components, at least some of said components including executable process logic of a business process and at least one port defining a standard representation of an external interface for data flow between said components;

creating connections between said ports corresponding to desired components; and binding, after said identifying step and said creating step, communication protocols to the connections to define communications parameters between said desired components.

26. The method as recited in claim 25, wherein said creating step comprises storing port connection information and port type information in a repository, and wherein said binding step comprises looking up said connection information and said port type information to configure connections between components.

27. The method as recited in claim 25, wherein said identifying step includes generating code for looking up said port connection information and said port type information to facilitate deployment of connections between components.

28. The method as recited in claim 27 wherein said port connection information includes information indicating ports to be connected, information relating to the type of the ports, and information indicating how to connect said ports.

29. The method as recited in claim 27, wherein said code is in the form of an object.

30. The method as recited in claim 29, wherein said code is written in an object-oriented programming language from a source of origin identified by JAVA.

31. The method as recited in claim 29, wherein said identifying step comprises automatically generating said code based on properties of the port.

32. The method as recited in claim 27, wherein said code defines a communication protocol.

33. The method as recited in claim 32, wherein the communication protocol defining how messages are to be formatted and how delivery is guaranteed is from a source of origin identified by CORBA.

34. The method as recited in claim 32 wherein the communication protocol is Remote Method Invocation (RMI).

35. The method as recited in claim 32 wherein the communication protocol corresponds to a channel.

36. A method of deploying an object oriented, graphical integration model of a computer architecture for integrating plural business processes, said method comprising:

identifying a plurality of components, at least one of said components including executable process logic of a business process and at least one port defining a standard representation of an external interface for data flow between said components;

creating connections between ports of desired components;

storing said components and connections in a repository as objects;

filling out unresolved component references; and deploying the objects by configuring run time properties of the objects.

37. The method as recited in claim 36, wherein said deploying the objects step comprises designation of a node or a physical device in which said components are to be executed.

38. The method as recited in claim 37, wherein said node comprises plural computers.

39. A method of creating reusable components for use in an object oriented, graphical representation of a computer architecture for integration and execution of plural business processes, said method comprising:

identifying child objects each including executable process logic of a business process and a port defining a standard representation of an external interface for data flow between the components of each child objects;

creating connections between desired ports of the child objects;

defining properties of the child objects that can be changed; and packaging the child objects as nested objects in a parent object.

40. The method as recited in claim 39, wherein the executable process logic comprises code objects, said step of packaging comprises bundling the code objects into an archive file and said step of defining properties comprises designating properties of the code objects as one of read only, hidden, or changeable.

41. The method as recited in claim 40, wherein the code objects are JAVA code objects and wherein the archive file is a platform independent file from a source of origin identified by JAVA Archive (JAR) file.

* * * * *